United States Patent
Agarwal et al.

(10) Patent No.: US 7,472,140 B2
(45) Date of Patent: Dec. 30, 2008

(54) LABEL-AWARE INDEX FOR EFFICIENT QUERIES IN A VERSIONING SYSTEM

(75) Inventors: Nipun Agarwal, Santa Clara, CA (US); Sam Idicula, San Jose, CA (US); Thomas Baby, Foster City, CA (US); Eric Sedlar, San Francisco, CA (US)

(73) Assignee: Oracle International Corporation, Redmond Shores, CA (US)

( * ) Notice: Subject to any disclaimer, the term of this patent is extended or adjusted under 35 U.S.C. 154(b) by 389 days.

(21) Appl. No.: 11/313,526

(22) Filed: Dec. 20, 2005

(65) Prior Publication Data

US 2007/0143363 A1 Jun. 21, 2007

(51) Int. Cl.
*G06F 17/30* (2006.01)

(52) U.S. Cl. .............. 707/203; 707/1; 707/2; 707/3; 707/101; 707/200

(58) Field of Classification Search ............... 707/1, 707/2, 4, 100, 203
See application file for complete search history.

(56) References Cited

U.S. PATENT DOCUMENTS

| | | | |
|---|---|---|---|
| 4,439,837 A | 3/1984 | Aiena et al. | |
| 4,536,873 A | 8/1985 | Leete | |
| 5,088,032 A | 2/1992 | Bosack | |
| 5,313,646 A | 5/1994 | Hendricks | |
| 5,678,040 A | 10/1997 | Vasudevan et al. | |
| 5,706,510 A | 1/1998 | Burgoon | |
| 5,734,899 A | 3/1998 | Yoshizawa et al. | |
| 6,085,188 A | 7/2000 | Bachmann et al. | |
| 6,279,007 B1 | 8/2001 | Uppala | |
| 6,427,123 B1* | 7/2002 | Sedlar | 702/2 |
| 6,460,052 B1* | 10/2002 | Thomas et al. | 707/203 |
| 6,587,854 B1 | 7/2003 | Guthrie et al. | |
| 6,631,386 B1* | 10/2003 | Arun et al. | 707/203 |
| 6,785,769 B1* | 8/2004 | Jacobs et al. | 711/118 |
| 6,959,416 B2 | 10/2005 | Manning et al. | |
| 7,117,216 B2 | 10/2006 | Chakraborty et al. | |

(Continued)

OTHER PUBLICATIONS

"Versioning Extensions to WebDAV (Web Distributed Authoring and Versioning)" retrieved on Feb. 27, 2006 from the Internet <URL: http://www.ietf.org/rfc/rfc3253.txt> (111 pages).

(Continued)

*Primary Examiner*—Charles Rones
*Assistant Examiner*—Rezwanul Mahmood
(74) *Attorney, Agent, or Firm*—Hickman Palermo Truong & Becker LLP; Daniel D. Ledesma

(57) ABSTRACT

A mechanism for querying a label-aware index in the context of versioning is provided. The key of the label-aware index is a composite key and includes a unique label identifier, corresponding to a specific label, and the key of the original index, which key itself may be a composite key. The label-aware index may be implemented as an index-organized table. The label-aware index is organized on disk first by the label identifier and then by the original index key so that queries of versions of resources within a particular label are as efficient as queries on an index of an unversioned repository with the same number of resources.

22 Claims, 3 Drawing Sheets

U.S. PATENT DOCUMENTS

| | | | |
|---|---|---|---|
| 7,139,746 | B2 | 11/2006 | Shin et al. |
| 7,287,033 | B2 * | 10/2007 | Shadmon et al. ............ 707/101 |
| 2002/0147634 | A1 | 10/2002 | Jacoby et al. |
| 2004/0088306 | A1 | 5/2004 | Murthy et al. |
| 2004/0205082 | A1 | 10/2004 | Fontoura et al. |
| 2004/0220912 | A1 | 11/2004 | Manikutty et al. |
| 2005/0091188 | A1 | 4/2005 | Pal et al. |
| 2005/0097084 | A1 | 5/2005 | Balmin et al. |
| 2005/0144198 | A1 | 6/2005 | Bergstraesser et al. |
| 2006/0271606 | A1 | 11/2006 | Tewksbary |
| 2006/0288056 | A1 | 12/2006 | Yamakawa et al. |
| 2007/0043715 | A1 | 2/2007 | Kaushik et al. |
| 2007/0118561 | A1 | 5/2007 | Idicula et al. |
| 2007/0136382 | A1 * | 6/2007 | Idicula et al. ............... 707/200 |
| 2007/0156687 | A1 * | 7/2007 | Idicula et al. ............... 707/203 |
| 2007/0162441 | A1 * | 7/2007 | Idicula et al. .................. 707/5 |

OTHER PUBLICATIONS

"WVCM: The Workspace Versioning and Configuration Management API" retrieved on Feb. 27, 2006 from the Internet <URL: http://www.webdav.org/deltav/wvcm/wvcm-overview.html>(15 pages).

Geoff Lee, "Oracle Database 10g Release 2 XML DB Technical Overview" An Oracle White Paper, May 2005, 28 pages, Oracle Corporation, Redwood Shores, California.

Mark Drake, "Oracle Database 10g Release 2 XML DB" An Oracle Technical White Paper, May 2005, 97 pages, Oracle Corporation, Redwood Shores, California.

Mark D. Drake, "Oracle Database 10g Release 2 XML DB & XML DB Repository" Oracle Date Sheet, May 2005, 6 pages, Oracle Corporation, Redwood Shores, California.

"Managing Content with Oracle XML DB", An Oracle White Paper, Mar. 2005, 38 pages, Redwood Shores, California.

Geoff Lee et al., "Mastering XML DB Storage in Oracle Database 10g Release 2" An Oracle White Paper, Mar. 2005, 15 pages, Oracle Corporation, Redwood Shores, California.

Geoff Lee, "Mastering XML DB Repository in Oracle Database 10g Release 2" An Oracle White Paper, Mar. 2005, 15 pages, Redwood Shores, California.

Sean Dillon, "Getting to XML", Oracle Magazine, May/Jun. 2005, 3 pages.

Oracle XML DB Developer's Guide 10g Release 2 (10.2) B14259-02, Aug. 2005, 24 pages.

"Oracle 9i Database Daily Feature", Oracle Technology Network, Jun. 2005, 3 pages.

Bill Beauregard, "Oracle Database 10g Workspace Manager Support for Oracle Spatial Topology Data Model" An Oracle White Paper, May 2005, 7 pages.

Bill Beauregard, "Oracle Database 10g Workspace Manager Overview" An Oracle White Paper, May 2005, 13 pages, Redwood Shores, California.

Bill Beauregard, "Using Oracle Workspace Manager to Cut Costs: Case Studies", Dec. 2003, 36 pages.

"IETF WEBDAV Working Group World Wide Web Distributed Authoring and Versioning" retrieved on Feb. 22, 2006 from the Internet<URL: http:/ftp.ics.uci.edu/pub/ietf/webdav/>6 pages.

"Versioning Extensions to WebDAV (Web Distributed Authoring and Versioning)" retrieved on Feb. 22, 2006 from the Internet<URL: http://www.webdav.org/deltav/protocol/rfc3253.html>(110 pages).

Chou, H. et al., "A Unifying Framework for Version Control in a CAD Environment" Aug. 1986 (pp. 336-344).

* cited by examiner

LABEL-AWARE INDEX ON EMPLOYEE NAME 122

| LABEL_ID | NAME | RES_ID |
|---|---|---|
| L1 | Adam | r1 |
| L1 | Eric | r2 |
| L1 | Nipun | r3 |
| L1 | Sam | r7 |
| L1 | Thomas | r5 |
| L2 | Adam | r1 |
| L2 | Eric | r8 |
| L2 | Nipun | r3 |
| L2 | Sam | r7 |
| L2 | Thomas | r10 |
| L3 | Adam | r11 |
| L3 | Eric | r8 |
| L3 | Nipun | r13 |
| L3 | Sam | r15 |
| L3 | Thomas | r19 |

124    126    128

RESOURCE TABLE 102

| RES_ID | CONTENT |
|---|---|
| r1 | ... |
| r2 | ... |
| r3 | ... |
| r4 | ... |
| r5 | ... |
| ... | ... |
| $r_n$ | ... |

104    106

EMPLOYEE NAME INDEX 112

| NAME | RES_ID |
|---|---|
| Adam | r1 |
| Eric | r2 |
| Nipun | r3 |
| Sam | r4 |
| Thomas | r5 |

LABEL-AWARE INDEX FOR EFFICIENT QUERIES IN A VERSIONING SYSTEM

FIELD OF THE INVENTION

The present invention relates to indexing, and more particularly to indexing based on labels in a versioning system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A database may provide a file repository that can be accessed via a variety of file system-based interfaces, such as those utilizing HTTP/WebDAV (Web Distributed Authoring and Versioning) or NFS (Network File System). Through such interfaces to the repository, a file is located, for example, via its URL or path and the repository is exposed as a hierarchical set of files and folders (e.g., directories). Further, data-oriented access mechanisms can be used to access a file repository, which expose the repository as a flat set of files that can be queried based on file content or attributes.

Versioning

Files in a repository may be versioned. Versioning is an essential feature of a content management repository. It is becoming increasingly important to retain older versions of documents and to query across all versions due to the current regulatory environment, especially in light of the Sarbanes-Oxley Act. Versioning is a technique for tracking the changes made to a particular file, providing the option to revert to an older version of a particular file, obtaining information on who made each change, and seeing the progression of changes to a particular file. Since each version may need to be indexed and accessed as a separate entity, each version is typically stored in a separate row of a resource table, which contains all versions of all files in the repository. In the context of versioning, "resource" is the term commonly used for the terms "file" and "folder" and is used herein to generally refer to a file or folder.

A version-controlled resource is one whose versions are tracked by the repository. The identity of a resource across its different versions is referred to as the resource's version history. An identifier referred to as the version history identifier has the same value for each version of a particular resource and may be associated with each version-controlled resource. There may be several versions of a version-controlled resource corresponding to a single version history.

When there are multiple versions of each resource (e.g., file), it becomes necessary to record a consistent set of resource versions corresponding to different points of time, releases, configurations, etc. These are typically known as labels or baselines. When a query is executed on a version-enabled resource table, the user normally wants to see only one version of each resource. Labels provide a convenient way to specify the version of each resource that is to be considered in the query. In many cases, a larger number of users will be querying in the context of a label than in the context of a user workspace (which typically belongs to a single user).

Because it is typical that each version is stored as a separate row in the resource table, the number of keys in an index (e.g., B-tree index) on the table increases with the number of versions. A large number of versions causes a significant deterioration in the performance of the index due to the larger number of blocks to be scanned and the increase in the height of the index. This is a problem especially in the context of a label since there may be a large number of users of a particular label. Ideally, since a user is typically working in the context of a particular label which selects only one version for each resource, the user should experience the same query performance when querying within the particular label as when querying an unversioned repository.

For example, suppose a resource table maintains 1,000 resources and the average number of versions per resource is five, then the total number of versioned resources in the resource table is 5,000. A particular label will only have 1,000 versions because a label selects only one version for each resource. Thus, querying within the context of the particular label should take roughly the same time as querying within an unversioned repository of 1,000 resources.

However, current systems do not provide a combination of data-oriented access and label-based version selection. Because many users are likely to query the repository on the basis of labels, it is important to have good performance for indexes in that context.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram illustrating a name index on resources in a resource table and a label-aware index based on the name index, according to an embodiment of the invention;

DETAILED DESCRIPTION

Figure 2:
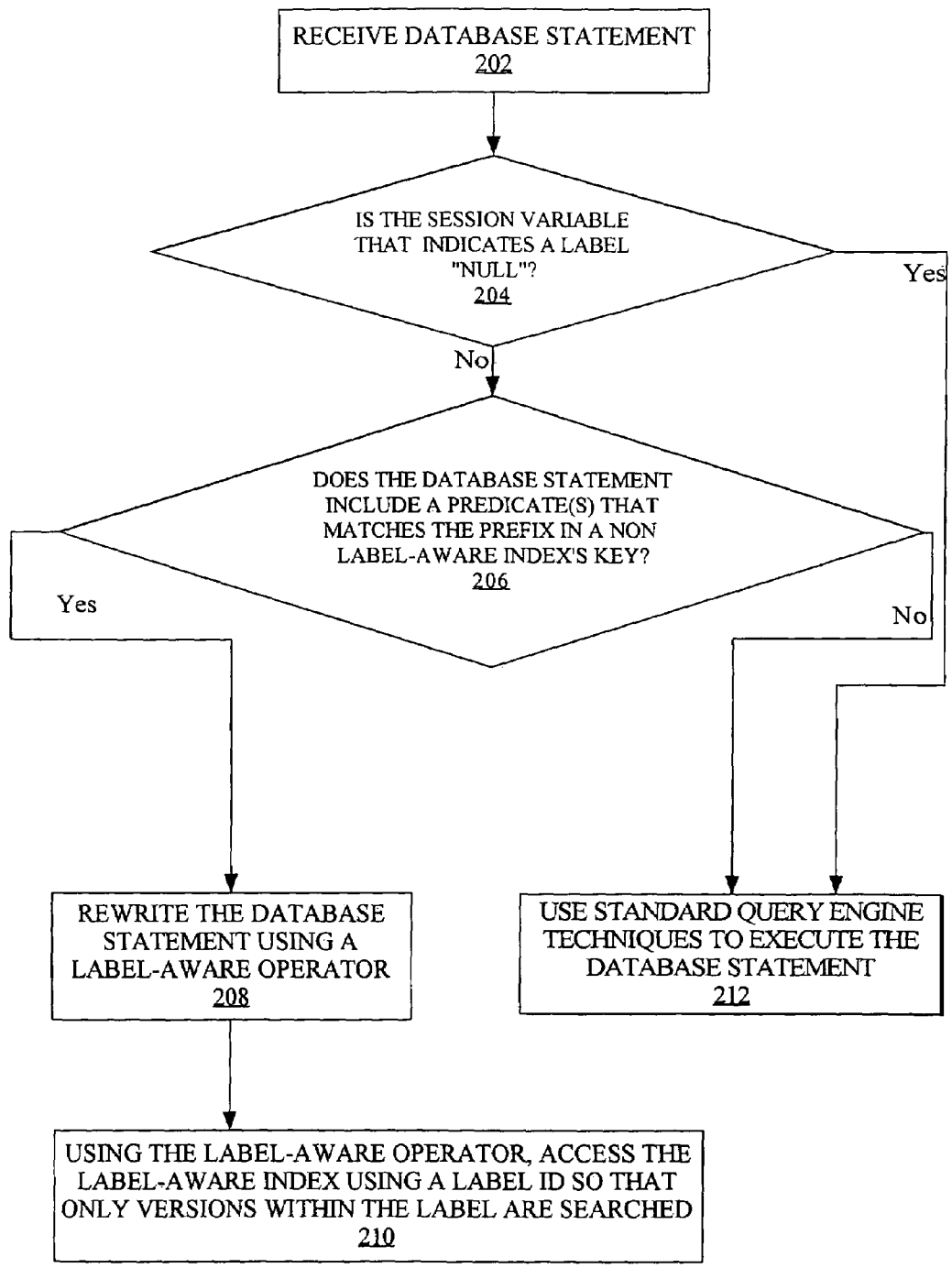
FIG. 2 is a flow diagram that illustrates a process for handling a database statement in order to enable a new operator to use a label-aware index, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

It is desirable to have an index (e.g., a B-tree-like index) that is aware of labels, so that when it is used in the context of a label, the performance of querying the index does not deteriorate with an increase in the average number of versions per resource. Thus, use of the label-aware index effectively limits a search to resources that are associated with a specific label. In one embodiment, the versioned resources in a particular index are subdivided by a label identifier so that each label constitutes a separate subtree in the index.

When a user logs into the database system and creates a session, a particular label is associated with that session.

Upon the issuance of a database statement, the database system determines whether the statement contains a condition on an attribute that is a component of a composite key to an index. According to one embodiment, the index is an index-organized table (IOT) that is organized based on the composite key. The composite key is comprised of a label identifier and a key of an original index. The attribute is a key, or a component of a another composite key, of the original index. The database statement is then rewritten to use the IOT based on the composite key.

Therefore, instead of searching across multiple labels in an index that indexes all versioned resources in each label, a user may search only across versioned resources in a particular label in which the user is interested.

OPERATING ENVIRONMENT-STORAGE SYSTEM

The techniques described herein may be implemented in the context of a database system and, according to one embodiment, are implemented in a database repository that supports versioning of hierarchically organized resources such as a file system-like repository. A database system typically comprises one or more clients that are communicatively coupled to a database server that is connected to a shared database. "Database server" may refer collectively to a cluster of server instances and machines on which the instances execute. Generally, a server is combination of integrated software components and an allocation of computational resources, such as memory, a node, and processes on the node for executing the integrated software components on a processor, where the combination of the software and computational resources are dedicated to providing a particular type of function on behalf of clients of the server.

Among other functions of database management, a database server governs and facilitates access to a particular database, processing requests by clients to access the database. In order for a client to interact with a server, a session is established for the client. A session, such as a database session, is a particular connection established from a client to a server, such as a database server. Through a session, the client can issue a series of requests (e.g., requests for data and/or metadata) to the database server.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command that is sent from a database application to a database server contains an original statement of the database command. For the database server to process the commands, the commands must conform to a database language supported by the database server. One non-limiting database language supported by many database servers is known as the Structured Query Language (SQL).

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A relational database system may be extended to provide native support for storage, management, and query of (and thus function as a repository for) particular types of data. For example, a traditional relational database system may be augmented with features and technologies to enable storage of XML documents directly in the database, and access to such XML data in either an XML-centric (e.g., using the XQuery query language) or a relational-centric (e.g., using the SQL query language) manner. Such a repository is at times referred to as an XML repository or an XML database (i.e., "XDB").

Resource Table

FIG. 1 is a block diagram illustrating an employee name index 112 on resources in a resource table 102 and a label-aware index 122 based on employee name index 112, according to one embodiment.

Resource table 102 is a data table that stores resources (e.g., contents of files stored in a repository component of the database) in the repository. When versioning is introduced into the repository, there may be an explosion in the size of resource table 102 due to the possibility of multiple versions for each resource. Thus, resource table 102 effectively stores multiple versions of multiple resources.

The schema of resource table 102 may vary from implementation to implementation, but is simply depicted in FIG. 1 as comprising columns for resource identifiers ('res_id') 104 and the content 106 of the respective versions of the resources. Each version of a given resource is associated with a unique resource identifier (e.g., r1). Further, content 106 of each resource may be stored in resource table 102, as depicted, or in a separate table.

Typical Employee Name Index

Employee name index 112 is a data structure that associates employee names 114 with their corresponding references 116 to resources, in resource table 102, that contain the corresponding employee name. Employee name index 112 may be implemented as a table, as depicted, or as a B-tree structure. Employee name index 112 illustrates a typical index on employee name enabling a quick search for resources in resource table 102 based on employee name.

In systems that support versioning, the number of rows in resource table 102 increases in relation to the number of versions of the various versioned resources. For instance, in the above example, suppose each resource corresponds to an employee record and that each employee record has multiple versions. A newer version of an employee record may indicate that the address of the corresponding employee was updated, or the last name was changed. Further suppose that a label is created for each year to indicate status and other information for each employee, e.g., for tax purposes. Thus, it may be the case that a particular employee has only one or two versions across all the labels in the database if the particular employee has not moved or is otherwise not associated with tax-related events. It may also be the case that another employee has a different version for each label stored in the database if the other employee is associated with tax-related events each year. Because multiple, perhaps many, versions of a resource may exist in resource table 102, the effectiveness of employee name index 112 will deteriorate in its ability to manage each version due to the larger number of blocks to be scanned and the increase in the height of the index.

Label-Aware Index

According to one embodiment of the invention, to mitigate the problem of increasing the size of an index, the res_ids corresponding to a particular label are essentially organized into a single subtree in an index. According to an embodiment, the index is a B-tree-like structure referred to as an index-organized table (IOT). Typically, a table is organized as a heap (i.e. table rows are put on disk in no particular order). However, with an IOT, table rows are organized on disk based on the index key. Furthermore, the IOT functions as a single index even though the amount of space the IOT occupies on disk is comparable to that of multiple indexes, e.g., with a separate index for each label.

FIG. 1 illustrates a label-aware index 122 based in part on an employee name key. In one embodiment, the IOT for a label-aware index has the following columns:

Label_ID 124, which is a unique identifier of a particular label;

Key 126, which is the same key as from the original index (e.g., Key 'Name' from Employee Name Index 112); and Res_ID 128, which is the resource identifier associated with the corresponding row in the resource table.

The primary key for the label-aware index is <Label_ID, Key>. In FIG. 1, the key for label-aware index 122 is <Label_ID 124, Name 126>. In other contexts, Key 126 may be a composite key comprised of multiple attributes (i.e., columns of a table). For instance, a key for an index uniquely identifying a class at a university may be class number and class time. Therefore, the key for a label-aware index on class schedule may be <Label_ID, class_number, class_time>.

Because the label-aware index is physically organized on the basis of this composite primary key, the res_ids 128 present in a particular label may be obtained by querying the IOT using a Label_ID-based predicate. Using Label_ID 124 as the first component of the label-aware index's primary key ensures that all rows belonging to a label are in a single "subtree" of the label-aware index, thus enabling a search across a particular label to be limited to resources of that particular label.

There may be more rows in a particular label-aware IOT than in the resource table because a row in the resource table may be selected by multiple labels. For this reason, it is not optimal to create a Label_ID column in the resource table and create an index on it.

In a typical case, the repository system will maintain only a few labels with a fraction of the number of versions for each resource being associated with a label. Therefore, the number of resources for each label multiplied by the number of labels will typically be less than the total number of versioned resources in the resource table.

Iot Maintenance

As with any index, a label-aware index is updated under certain conditions. When a new label is created, rows are inserted into the label-aware index corresponding to all rows selected by the label in the resource table. When a label is deleted, all rows with the corresponding Label_ID are deleted from the label-aware index. When a label is updated to select a different version of a resource, the corresponding row in the label-aware index is updated to have a new res_id 128 (and a new Key value 126, if it has changed). Lastly, when a row in the resource table is deleted, all rows in the label-aware index corresponding to that res_id are deleted.

LBL_Pred Operator

According to an embodiment, a new operator is defined that "knows" the properties of the label-aware index and how to query it. The new operator is referred to herein as LBL_PRED. In one embodiment, the arguments of the new operator consist of the first component of Key 126 and a parameter in which predicate information (for the first column and the other columns of the key) is encoded. The operator will return an indication of whether or not an entry or row in the label-aware index satisfies all the predicates and is present in the label. Operation of the LBL_PRED operator is described in greater detail hereafter.

Responding to a Query on the Repository

FIG. 2 is a flow diagram that illustrates a process for handling a database statement by enabling an operator to use a label-aware index or table, according to an embodiment of the invention. The process illustrated in FIG. 2 is implemented for automated performance by a conventional computing system, such as computer system 300 of FIG. 3. One possible operating environment in which the process of FIG. 2 may be implemented is a database system.

After a database statement is received (block 202), a session variable is checked to determine if a label is identified indicating that the database statement is issued in the context of a label (block 204). If the value of the session variable is "null," then standard query engine techniques are used to execute the database statement (block 212). If the value of the session variable indicating a label is not "null," then each AND chain in the WHERE clause is traversed to check whether any predicate (or set of predicates) matches the prefix of a non-label-aware index's key (block 206), such as the 'Name' key of Employee Name Index 112 (FIG. 1). In another embodiment, a predicate (or set of predicates) is matched against the Key portion of a label-aware index. If the database statement does not include an attribute in the WHERE clause that comprises a component of a composite key in a label-aware index (block 206), then standard query engine techniques are used to execute the database statement (block 212). However, if the database statement does include an applicable predicate, then the predicate is rewritten with a LBL_PRED operator (block 208) whose parameter contains at least the operator and value in each predicate. According to one embodiment, this rewrite is performed during the semantic analysis stage. The rewrite ensures that a label-aware IOT will be used for the query (block 210) enabling the execution engine to search only versions within a particular label.

For example, suppose an employer would like to find out the social security number and address of a particular employee. Further suppose that an index exists (e.g., Employee Name Index 112) that associates the names of employees with their respective social security numbers, names, addresses, etc. Such a database statement may look like the following:

```
SELECT ssn, address
FROM emp
WHERE name='Sam';
```
After the employer issues the database statement and before the database statement is executed, an indicator is used to indicate whether the statement was issued in the context of a label. For instance, the label to be used may be part of the query itself (i.e., adding a predicate such as label=L1 to the WHERE clause) or a session variable, as part of the query environment and associated with the query, may indicate the label. If the session variable has the value "null," then the database statement is not issued in the context of labels. Otherwise, the value of the session variable indicates the particular label to search in.

The database statement is also examined to determine whether 1) any attribute in the WHERE clause is 1) part of a composite key of a label-aware index or table, or 2) the key or a component of the key of a non-label-aware index. Because "name" is part of the composite key of label-aware index 122 and the database statement was issued in the context of labels, the statement will be rewritten as follows:
```
SELECT ssn, address
FROM emp
WHERE LBL_PRED(name, 'Sam')=1;
```
Thus, the operator LBL_PRED replaces the old predicate to indicate to the query engine that there is an attribute associated with a label-aware index. In this example, the attribute is "name" and the value of "name" is 'Sam.' The database system determines which label is associated with the particular session. Using this rewritten query, the new operator and the label identifier associated with the session are processed by the query engine.

In another embodiment of the invention, the issued database statement includes the LBL_PRED operator. In such a case, no rewrite needs to be performed and the new operator and label identifier associated with the session are processed by the query engine.

Subsequently, label-aware index 122 is accessed and only the rows in label-aware index 122 with the same Label_ID as the label identifier of the session may be examined. The keyed attribute from the database statement also ensures that no more data than is necessary is examined from the label-aware index. Thus, given a database statement, the execution time of the database statement in a label-aware versioned repository may be roughly the same as the execution time in an unversioned repository where there is only one version per resource.

Hardware Overview

Figure 3:
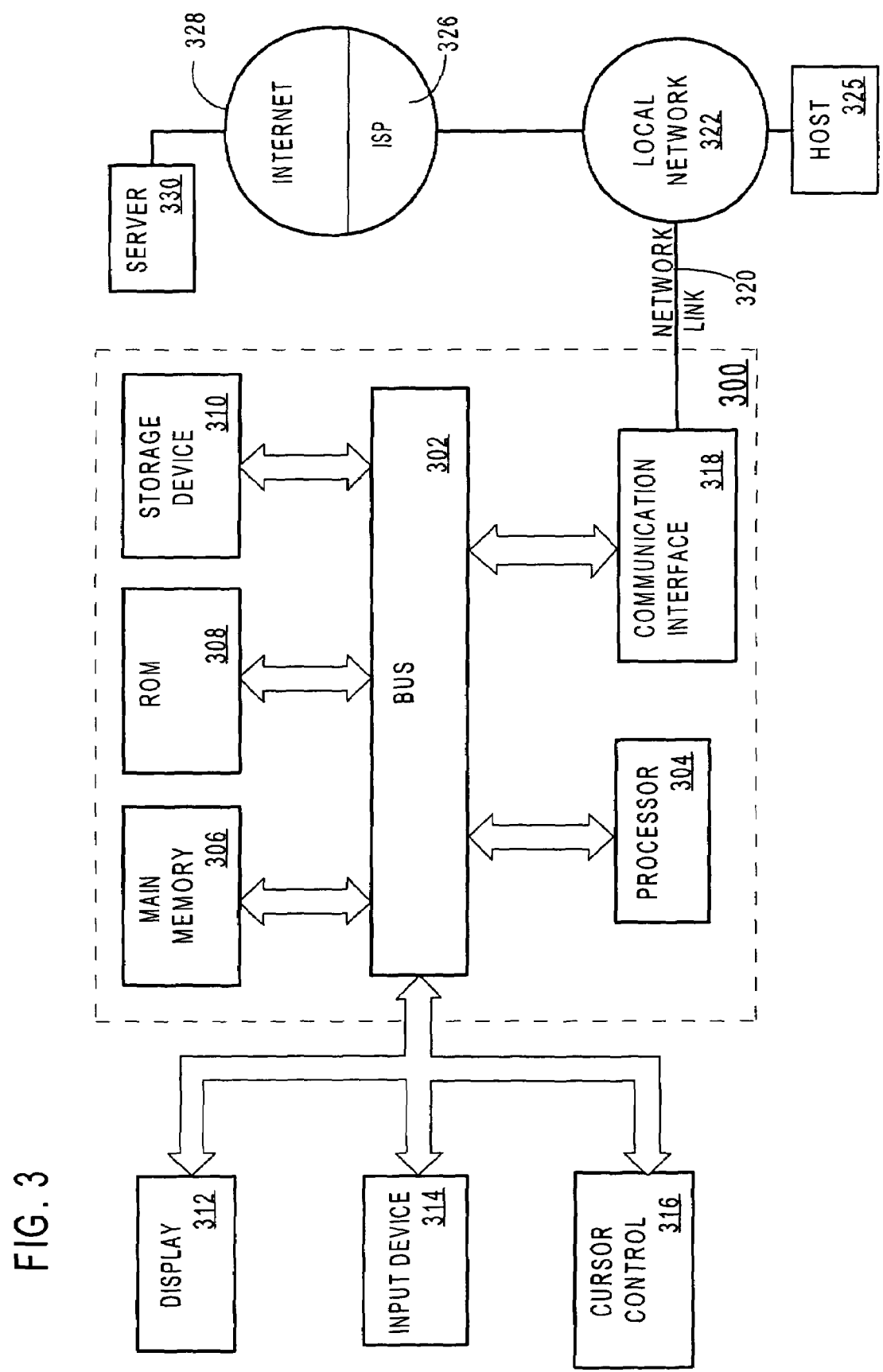
FIG. 3 is a block diagram that illustrates a computer system 300 upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
receiving a database statement for searching across resources, associated with a particular label of a plurality of labels, in a repository,
wherein each label of the plurality of labels (a) is associated with no more than one version of any particular resource and (b) is associated with a different label identifier;
wherein the plurality of labels are separate and distinct from any version information that indicates the version of each resource, in the repository, relative to other versions of said each resource;
in response to receiving the database statement, executing the database statement; and
during execution of the database statement:
traversing a particular index based, at least in part, on a label identifier that is associated with the particular label, to locate entries within the particular index that are associated with the label identifier, wherein the particular index indexes multiple versions of multiple resources;
accessing resources associated with the particular label based on information from the entries associated with the label identifier; and
generating output in response to accessing the resources associated with the particular label based on information from the entries associated with the label identifier.

2. The method of claim 1, wherein:
the particular index is based on a composite key that comprises a first component corresponding to label identifiers;
receiving a database statement includes:
determining that the database statement contains a condition on an attribute that is a second component of the composite key on which the particular index is based; and
rewriting the database statement to include an operator which, when executed, causes performance of an operation that uses the particular index.

3. The method of claim 1, wherein the particular index is an index-organized table.

4. The method of claim 1, wherein the particular index is organized on disk by (i) the label identifier of each versioned resource and (ii) by a key of a different index upon which the particular index is based.

5. The method of claim 1, wherein:
the particular index is based on a composite key that comprises a first component corresponding to label identifiers; and
the composite key further comprises a second component that is a component of a key of a different index upon which the particular index is based.

6. The method of claim 5, wherein the database statement includes an attribute corresponding to the second component and a value associated with the attribute.

7. The method of claim 1, further comprising creating a new label, in the plurality of labels, by inserting entries, into the particular index, corresponding to the versions identified by the new label.

8. The method of claim 1, further comprising deleting a second label, of the plurality of labels, by deleting all entries in the particular index that are associated with the label identifier of the second label.

9. The method of claim 1, further comprising selecting a different version of a specific resource by replacing, in the particular index, a resource identifier associated with a previous version of the specific resource with a resource identifier associated with the different version of the specific resource.

10. The method of claim 1, further comprising:
deleting a particular row in a resource table, wherein the resource table stores the content, or a reference to the content, of each version in the repository; and
deleting entries in the particular index corresponding to the resource identifier associated with the particular row.

11. A machine-readable storage medium storing instructions which, when executed by one or more processors, cause the one or more processors to perform the method recited in claim 1.

12. A machine-readable storage medium storing instructions which, when executed by one or more processors, cause the one or more processors to perform the method recited in claim 2.

13. A machine-readable storage medium storing instructions which, when executed by one or more processors, cause the one or more processors to perform the method recited in claim 3.

14. A machine-readable storage medium storing instructions which, when executed by one or more processors, cause the one or more processors to perform the method recited in claim 4.

15. A machine-readable storage medium storing instructions which, when executed by one or more processors, cause the one or more processors to perform the method recited in claim 5.

16. A machine-readable storage medium storing instructions which, when executed by one or more processors, cause the one or more processors to perform the method recited in claim 6.

17. A machine-readable storage medium storing instructions which, when executed by one or more processors, cause the one or more processors to perform the method recited in claim 7.

18. A machine-readable storage medium storing instructions which, when executed by one or more processors, cause the one or more processors to perform the method recited in claim 8.

19. A machine-readable storage medium storing instructions which, when executed by one or more processors, cause the one or more processors to perform the method recited in claim 9.

20. A machine-readable storage medium storing instructions which, when executed by one or more processors, cause the one or more processors to perform the method recited in claim 10.

21. The method of claim 1, wherein a particular version of a particular resource in the repository is associated with multiple labels of the plurality of labels.

22. A machine-readable storage medium storing instructions which, when executed by one or more processors, cause the one or more processors to perform the method recited in claim 21.

* * * * *

UNITED STATES PATENT AND TRADEMARK OFFICE
CERTIFICATE OF CORRECTION

PATENT NO. : 7,472,140 B2 Page 1 of 1
APPLICATION NO. : 11/313526
DATED : December 30, 2008
INVENTOR(S) : Agarwal et al.

It is certified that error appears in the above-identified patent and that said Letters Patent is hereby corrected as shown below:

On page 2, under "Other Publications", in column 1, line 11, delete "Date" and insert -- Data --, therefor.

In column 3, line 8, after "of" delete "a".

Signed and Sealed this

Fourth Day of May, 2010

David J. Kappos
*Director of the United States Patent and Trademark Office*